US011526534B2

(12) United States Patent
Sofia et al.

(10) Patent No.: US 11,526,534 B2
(45) Date of Patent: Dec. 13, 2022

(54) REPLICATING DATA CHANGES THROUGH DISTRIBUTED INVALIDATION

(71) Applicant: INTERNATIONAL BUSINESS MACHINES CORPORATION, Armonk, NY (US)

(72) Inventors: Anthony Thomas Sofia, Hopewell Junction, NY (US); Jason G. Katonica, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 139 days.

(21) Appl. No.: 16/868,896

(22) Filed: May 7, 2020

(65) Prior Publication Data

US 2021/0349917 A1     Nov. 11, 2021

(51) Int. Cl.
*G06F 16/27*     (2019.01)
*G06F 16/23*     (2019.01)

(52) U.S. Cl.
CPC ........ *G06F 16/273* (2019.01); *G06F 16/2365* (2019.01)

(58) Field of Classification Search
CPC ........................... G06F 16/273; G06F 16/2365
See application file for complete search history.

(56) References Cited

U.S. PATENT DOCUMENTS

| | | | |
|---|---|---|---|
| 9,477,598 B2 | 10/2016 | Song | |
| 10,146,961 B1 | 12/2018 | Baruch | |
| 10,922,132 B1* | 2/2021 | Shiramshetti | G06F 21/53 |
| 2013/0031051 A1* | 1/2013 | Mujumdar | G06F 16/273 |
| | | | 707/626 |
| 2018/0241561 A1* | 8/2018 | Albertson | H04L 9/0891 |

OTHER PUBLICATIONS

Baker et al., "Megastore: Providing scalable, highly available storage for interactive services," 5th Biennial Conference on Innovative Data Systems Research (CIDR '11) Jan. 9-12, 2011, pp. 223-234.

* cited by examiner

*Primary Examiner* — Albert M Phillips, III
(74) *Attorney, Agent, or Firm* — Cantor Colburn LLP; Edward Wixted (57) ABSTRACT

A computer-implemented method for replicating data changes through distributed invalidation includes receiving, by a distributed database system, an instruction to change a data element in a table. The distributed database system includes at least a first server and a second server. A first copy of the table is stored on the first server, and a second copy of the table is stored on the second server. The method further includes in response to the instruction, determining that the data element is secured by a replication key that is stored on a shared key management system that is accessible by the first server and by the second server, wherein the replication key is unique to the data element. The method further includes invalidating the replication key and modifying the first copy of the table on the first server according to the instruction that is received.

16 Claims, 8 Drawing Sheets

REPLICATING DATA CHANGES THROUGH DISTRIBUTED INVALIDATION

BACKGROUND

The present invention generally relates to computing technology, and more particularly, to a database management system that manages storage of electronic data in a distributed database system in a secured manner.

Data replication is the frequent electronic copying of data records stored on a source data store to a replica data store, either for data recovery or to allow users on multiple computing devices to access data relevant to their tasks without interfering with the work of others. In data storage systems, it is often desirable to have stored data replicated in multiple locations so that the data is available locally in each of the locations. Each location will have a local data storage device, which can satisfy requests to read data on its own, i.e., without needing to query other data storage devices of the data storage system.

SUMMARY

A computer-implemented method for replicating data changes through distributed invalidation includes receiving, by a distributed database system, an instruction to change a data element in a table. The distributed database system includes at least a first server and a second server. A first copy of the table is stored on the first server, and a second copy of the table is stored on the second server. The method further includes in response to the instruction, determining that the data element is secured by a replication key that is stored on a shared key management system that is accessible by the first server and by the second server, wherein the replication key is unique to the data element. The method further includes invalidating the replication key and modifying the first copy of the table on the first server according to the instruction that is received.

According to one or more embodiments of the present invention, a distributed database system includes multiple computer servers that store replicas of data, including at least a first server and a second server. The system further includes a memory device, and one or more processors coupled with the memory device and the servers. The processors perform a method for replicating data changes through distributed invalidation.

According to one or more embodiments of the present invention, a computer program product includes a storage medium readable by one or more processing circuits. The storage medium stores instructions executable by the one or more processing circuits to cause a method for replicating data changes through distributed invalidation to be performed.

Additional technical features and benefits are realized through the techniques of the present invention. Embodiments and aspects of the invention are described in detail herein and are considered a part of the claimed subject matter. For a better understanding, refer to the detailed description and to the drawings.

The diagrams depicted herein are illustrative. There can be many variations to the diagrams, or to the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All these variations are considered a part of the specification.

DETAILED DESCRIPTION

Example embodiments of the present invention relate to, among other things, devices, systems, methods, computer-readable media, techniques, and methodologies for improving a database system. Change data capture technology is used in order to keep a database system synchronized with low latency. For such change data capture, the database system replicates instructions to change one or more data elements in the database. For example, such instructions to change a data element can include instructions to INSERT, UPDATE, and DELETE a data element. In a database system that implements change data capture, such instructions change the data element(s) between a target database to a replica database. Embodiments of the present invention further improve such distributed database systems with replicas of the stored data by facilitating invalidation of replicated data in case of changes being made to one site. In one or more embodiments of the present invention, such invalidation is performed in the case of data elements that are to be secured, such as by encryption.

Change data capture includes capturing data from a database update log and capturing the update records into a change-table with updated records as well as metadata. The change-table is then used to apply only the updated records into a replica of the original database.

Figure 1:
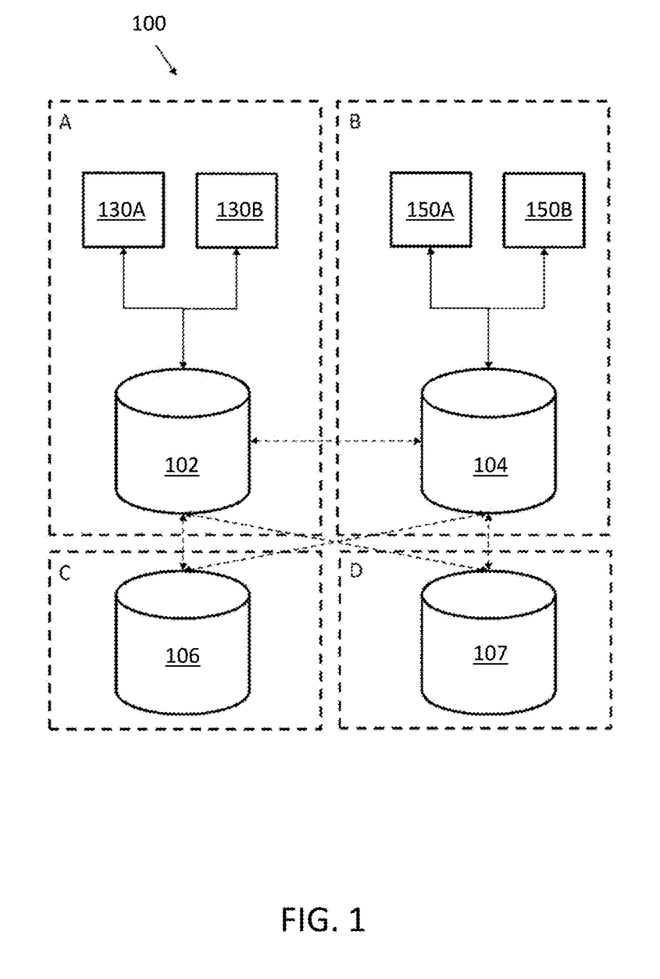
FIG. 1 is a schematic diagram of a data storage system in accordance with one illustrative embodiment of the present invention.

FIG. 1 depicts a database system that implements change data capture according to one or more embodiments of the present invention. The database system 100 includes at site A, a first data storage device 102 and host devices 130A and 130B, amongst others, in communication with the first data storage device 102. The host devices 130A and 130B make requests to read data from and write data to the first data storage device 102. The database system 100 further includes, at a site B, a second data storage device 104 and host devices 150A and 150B, amongst others, in communication with the second data storage device 104. Similarly, the host devices 150A and 150B make requests to read data from and write data to the second data storage device 104.

The first data storage device 102 and second data storage device 104 are in communication with each other so that the data they store, including any updates to the data made by requests to write data, is replicated at each of sites A and B.

The database system 100 further includes, at a site C, a third data storage device 106, and, at a site D, a fourth data storage device 107. Unlike the first data storage device 102 at site A and the second data storage device 104 at site B, the third data storage device 106 and fourth data storage device 107 are not in communication with any host devices. As a result, the third data storage device 106 and fourth data storage device 107 will not receive any requests to read or write data. Such sites with data storage devices that are not themselves receiving write requests from host devices, and so are merely acting as copies of data stored elsewhere, are described herein as non-active sites.

However, the third data storage device 106 and fourth data storage device 107 are each in communication with the first data storage device 102 and the second data storage device 104, and each replicates the data stored at each of site A and B. In use, the third data storage device 106 and fourth data storage device 107 might, for example, be maintained while the migration is being done from one site to another (e.g., from site A to site C), while site A is remaining in active use; or to provide a backup for use in the case one of the first data storage device 102 or second data storage device 104 fails.

While in the embodiment shown in FIG. 1 the third data storage device 106 and fourth data storage device 107 are located at different sites from the first data storage device 102 and the second data storage device 104, in alternative embodiments one or both may be located at the same site as first data storage device 102 or the second data storage device 104. Further, while in embodiment shown in FIG. 1, site A and site B, each includes only a single data storage device in communication with host devices, in other alternative embodiments sites may include multiple data storage devices in communication with one or more host devices.

The first data storage device 102 and second data storage device 104 can replicate data between themselves.

It is understood that the shown data storage devices and sites are just one example embodiment of the present invention and that in other embodiments of the present invention, the number of sites, storage devices, and their organization can vary from the depicted example.

Figure 2:
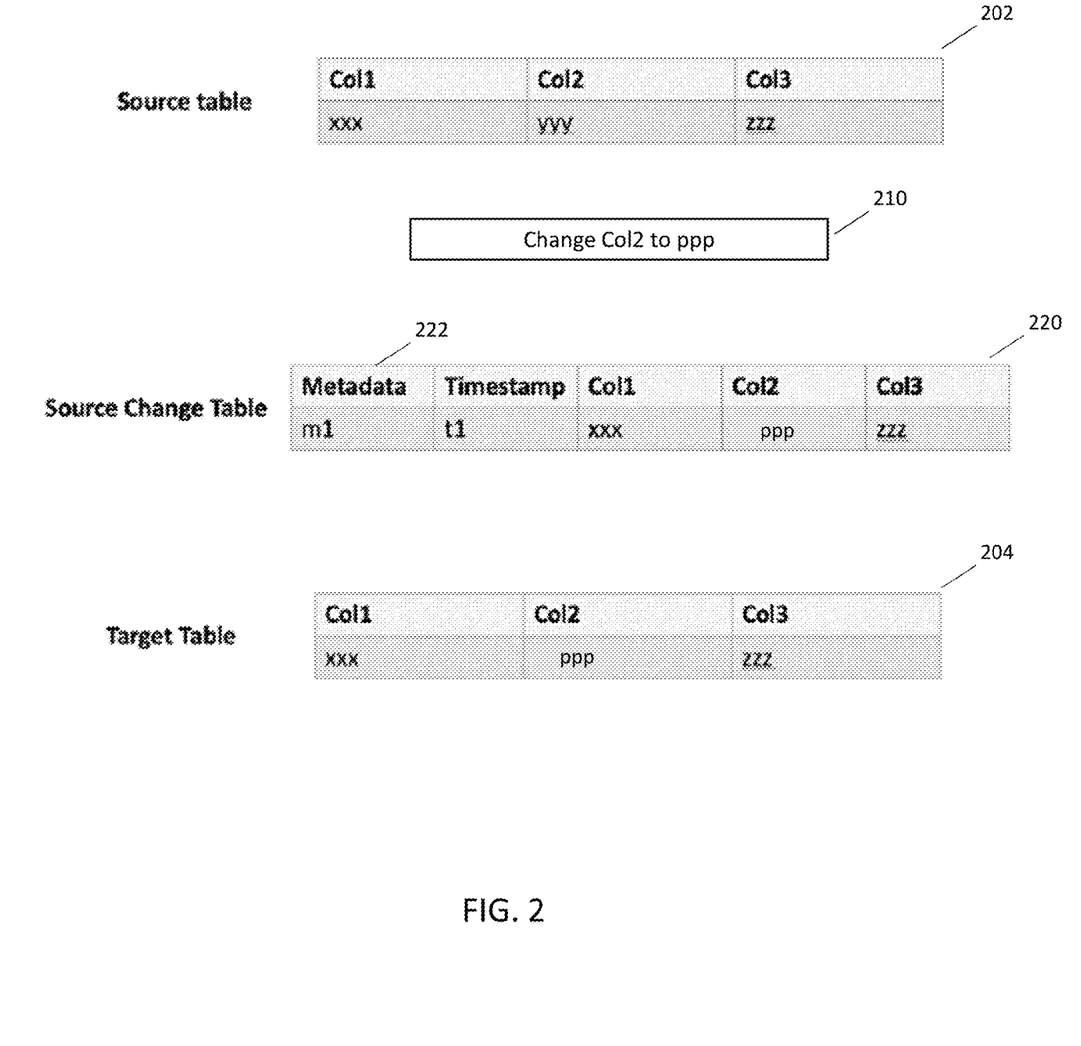
FIG. 2 depicts a block diagram and operational flow for changing a data element in a data storage device.

FIG. 2 depicts a block diagram and operational flow for changing a data element in a data storage device. In the depicted example, the first data storage device 102 is illustrated; however, it is understood that any other storage device can be operated in the same manner. Further, it is understood that although, in the examples described herein, the data storage device stores data using a table data structure, the data storage device can store the data using other types of data structures, which can also be updated in substantially the same manner as a table. A data element can be a data field, i.e., a cell represented by a row-column combination. Alternatively, or in addition, a data element can be an entire row or an entire column in the table.

Consider, in the example scenario of FIG. 2, that the source table 202 includes data elements, and that one or more data elements are to be updated by an instruction 210. In the example scenario herein, the data element being changed is the field represented by row-1, col-2, such that the existing value of "yyy" is being changed to "ppp." It should be further noted that the data values can be different in other embodiments of the present invention. Also, the number of rows and columns in table 202 is exemplary and that in one or more embodiments of the present invention the table 202 can include a different number of rows and columns. Further yet, while the example scenario depicts an "update" operation that changes an existing value, in one or more embodiments of the present invention, the change can include inserting a new value or deleting an existing value of a data element.

Referring to the example scenario, the instruction 210 changes the source table 202 to a target table 204. For changing the data per the instruction 210, by using data change capture techniques, the database system 100 creates a change-table 220 in response to the instruction 210. The change-table 220 is an intermediate data structure that stores update records. The update records that are stored in the change-table 220 contain the values that are going to be applied to the target table 204. The database system 100 subsequently uses an apply process that transforms the data elements that are to be updated. In one or more embodiments of the present invention, the data elements that are to be updated are noted in a metadata portion 222 of the change-table 220. In one or more embodiments of the present invention, the metadata portion 222 can indicate an operation that is to be performed for the change to be applied.

However, technical challenges exist with such change capture techniques when applied to a distributed database system 100 when the data elements are to be secured, such as by encryption, masking, or any other technique to secure the data. For example, when the data elements are to be securely changed at the site A, any downstream replicas of the secured data, for example, in site B, C, and/or D, can continue to have the non-updated, and more importantly, non-secured data as part of the data stores in that/those sites. Accordingly, invalidating such downstream copies of the data can be a technical challenge.

Such technical challenges are addressed by one or more embodiments of the present invention. Embodiments of the present invention facilitate protecting each data element in a data store using a separate unique encryption key-part. The encryption key-part is required to access that data element. Further, when an UPDATE or DELETE is performed, a new security key-part is generated for the updated data element(s), and the old encryption key-part is invalidated, so that the old data that is now updated in one site can no longer be opened at any of the other sites using the old encryption key-part. Accordingly, the security of the data element is maintained across the various sites in the distributed database system.

Figure 3:
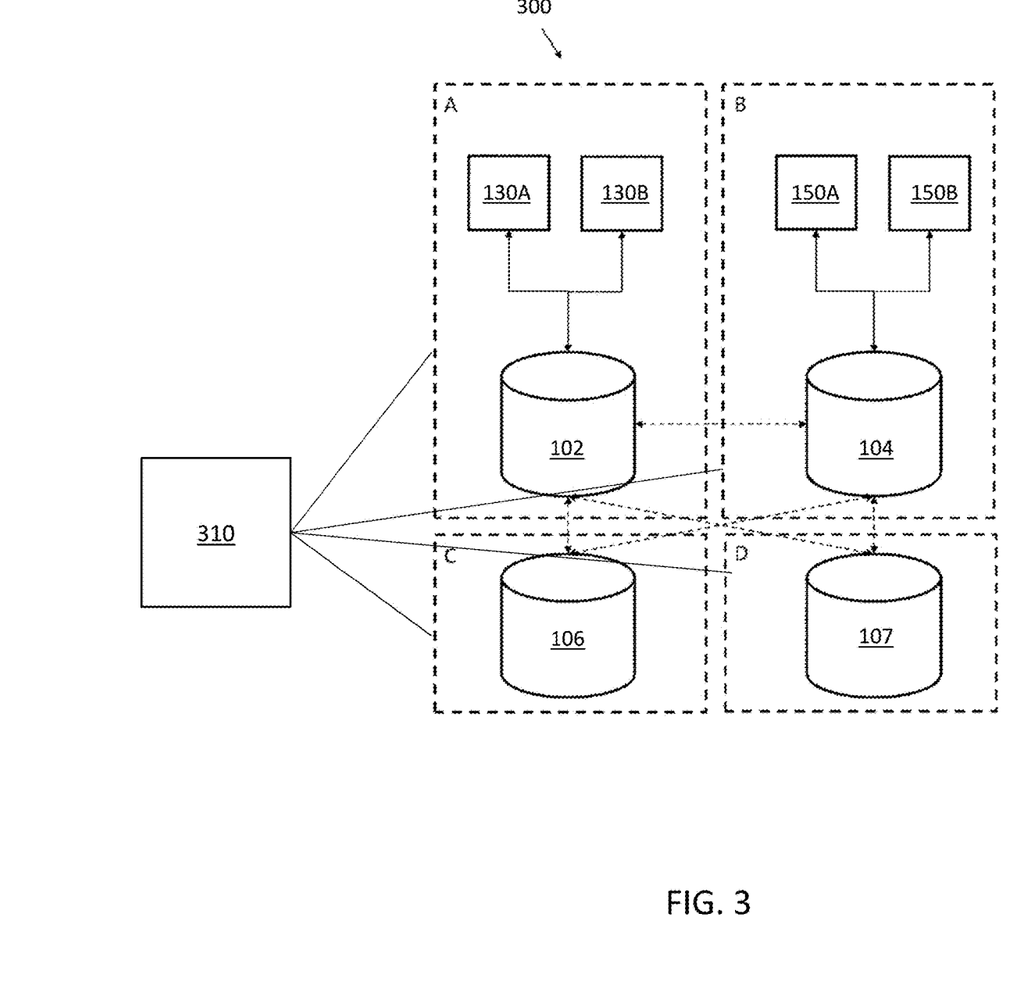
FIG. 3 is a schematic diagram of a data storage system that securely replicates data changes in accordance with one illustrative embodiment of the present invention.

FIG. 3 is a schematic diagram of a database system 300 that securely replicates data changes in accordance with one illustrative embodiment of the present invention. The database system 300 includes the sites A, B, C, and D, along with the data storage devices at those sites as described herein. Such a description is not repeated. FIG. 3 provides an improved database system 300 by using a shared key management system 310 that can be accessed for data storage/retrieval by any of the storage devices at the data storage sites A, B, C, and D.

The shared key management system 310 can be any key management system (KMS), also known as a cryptographic key management system (CKMS), that is presently known or will be developed in the future. The shared key management system 310 is responsible for providing an integrated approach for generating, distributing, and managing cryptographic keys for the database system 300 at all the sites of the database system 300. Accordingly, the shared key management system 310 includes hardware and/or software to provide the functionality for key generation, distribution, and replacement as well as the functionality for injecting keys, storing, and managing keys on devices. In one or more embodiments of the present invention, one or more components of the database system 300 communicates with the shared key management system 310 using a predetermined protocol, such as the key management interoperability protocol (KMIP) or any other such protocols that allow for the creation of keys and their distribution. It should be noted that the cryptographic keys used for securing the data elements in the database system 300 can include symmetric and asymmetric. The shared key management system 310 facilitates managing the keys in a variety of formats, the wrapping of keys, provisioning schemes, and performing one or more cryptographic operations as well as handling metadata associated with the keys.

The data elements in the data storage device 102 in the database system 300 are secured using a part of a cryptographic key, such as a public part of the cryptographic key. The cryptographic key also holds a private part. The public part can be used only to encrypt the value of the data element, whereas the private part is required to decrypt the encrypted value. Here "value" of the data element can also be referred to as "content" of the data element. In one or more embodiments of the present invention, each data element is associated with a unique key-part. In other words, there are as many unique key-parts as there are data elements in the database system 300. The unique key-parts are the private parts of the cryptographic keys, where the unique key-parts are required to access the value of the data element.

The unique key-parts are stored in the shared key management system 310. A handle to the unique key-part of a data element is stored in the metadata associated with that data element.

Figure 4:
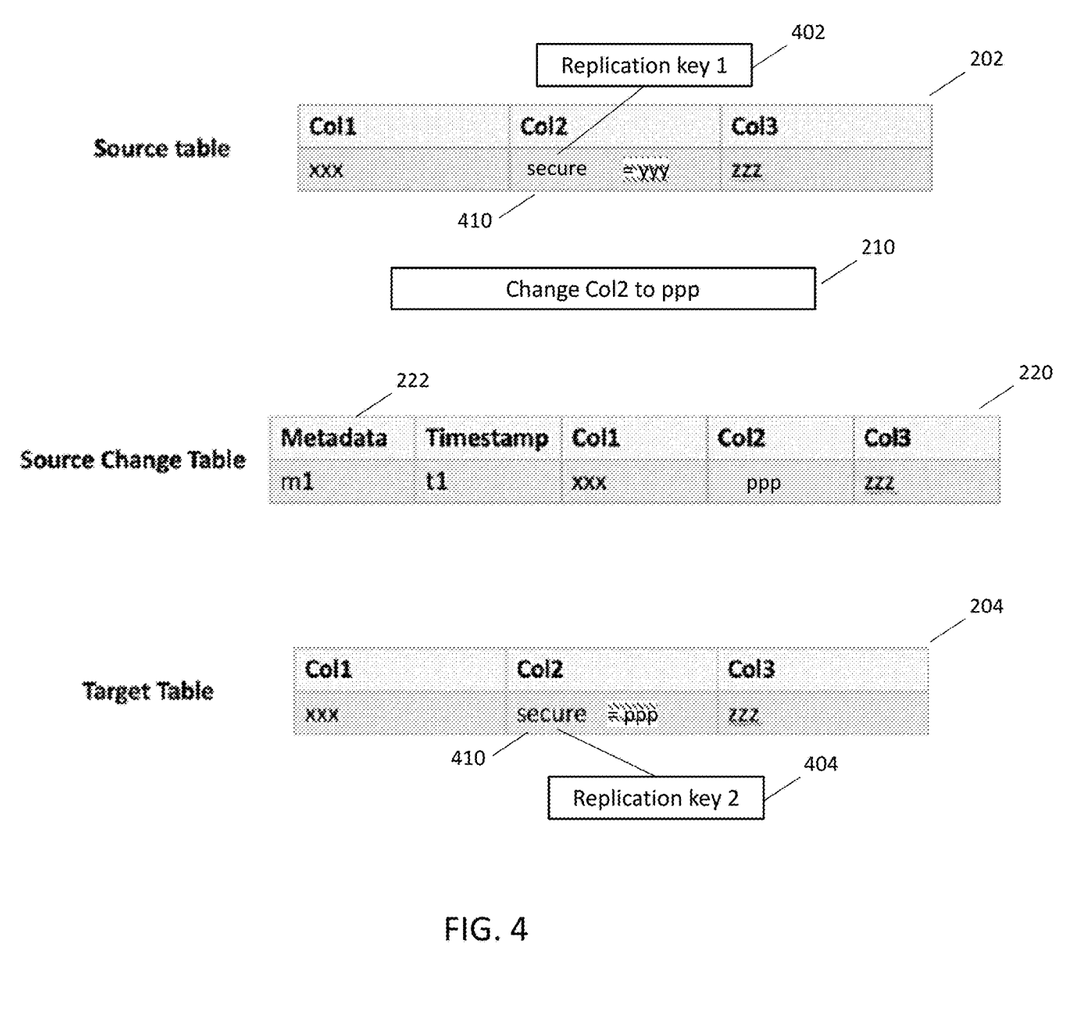
FIG. 4 depicts a block diagram of a data element in a data storage device system that securely replicates data changes according to one or more embodiments of the present invention.

FIG. 4 depicts a block diagram for a data element in a data storage device system that securely replicates data changes according to one or more embodiments of the present invention. Here, consider that each of the data fields in the source table 202 requires a unique key-part for decrypting the value stored in the data fields. Accordingly, data field 410 at Row1-Col2 has a first replication key 402, which is a unique key-part. The first replication key 402 is required to decrypt the secured content of the data field 410 in the source table 202. As in the previous example, consider that the data field 410 stores the value "yyy." Upon receiving the instruction 210 to change the value to "ppp," the database system 300 generates a second replication key 404 as the unique key-part that is associated with the data field 410 in the target table 204. The first replication key 402 is invalidated, and the second replication key 404 is now used (required) to decrypt the value ("ppp") in that data field 410. The first replication key 402 cannot decrypt the value ("ppp") of the data field 410 after the invalidation.

The replication keys are unique to the data element, e.g., row of data, or to each individual data field.

In one or more embodiments of the present invention, the unique key-parts are used to protect the data elements; in this case, the data field can be a Data Encryption Key (DEK). The replication keys 402, 404, can be part of the DEK associated with the data field. References to the replication keys 402, 404 are stored in the metadata associated with the data element. Alternatively, or in addition, the references to the replication key 402, 404 is stored in the data field itself. The replication keys 402, 404 are stored in the shared key management system 310, which can be accessed using the respective references.

In one or more embodiments of the present invention, the DEK is wrapped by a Key Encrypting Key (KEK). The KEK can have multiple parts associated with it, as is known in the art. All the parts of the KEK can be combined, through a variety of methods, into a single KEK that can be used to open the DEK. Each part of the KEK is referenced in the data element that uses that part. For example, a part of the KEK can be referenced using a label, a key check value, etc. The replication keys are unique to the data element, e.g., row of data, or to each individual data field. When the data element is protected, the replication key 402, 404, is used in the derivation of the KEK, and the reference to the replication key 402, 404 is included in the protected data element. The replication key 402, 404 is stored in the shared key management system 310.

It should be noted that in one or more embodiments of the present invention the replication key is part of the DEK, and a KEK may not be used by the shared key management system 310. As noted, the replication keys 402, 404, are parts of the DEK in this case. Alternatively, or in addition, a DEK itself can be a replication key.

The shared key management system 310 is used to invalidate, and generate the replication keys (i.e., unique key-parts). The shared key management system 310 is also used to encrypt and decrypt the data values using the replication keys, and other parts of the KEK and/or DEK.

Figure 5:
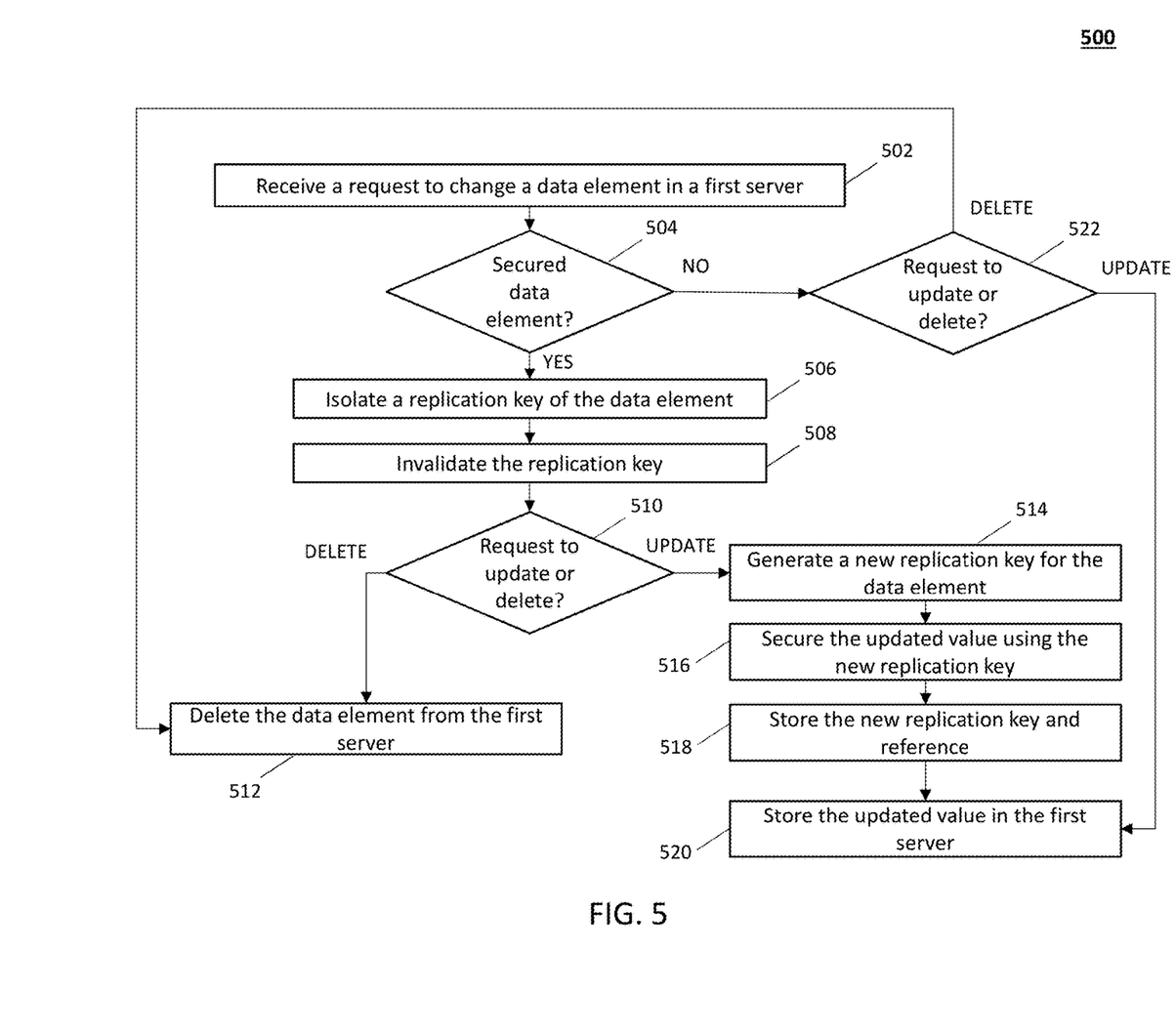
FIG. 5 depicts a flowchart of a method for replicating data changes through distributed invalidation according to one or more embodiments of the present invention.

FIG. 5 depicts a flowchart of a method 500 for replicating data changes through distributed invalidation according to one or more embodiments of the present invention. The method 500 can be executed by one or more processing units that are part of the database system 300. The method 500 includes receiving an instruction 210 to change a data element in the first data storage device 102, at block 502. The instruction 210 can be in the form of a computer-executable instruction, such as using a structured query language (SQL) or other such programming languages.

The method 500 further includes determining whether the data element 410 that is being changed is a secured data element, at block 504. For example, the data element 410, such as a row, or a field, or a column, can be secured by using an encryption key as described herein. Alternatively, the data element 410 may not be secured. The user settings associated with the first data storage device 102 can include information on whether the data element 410 is secured. The database system 300 can check whether the data element 410 is secured based on the user settings. Alternatively, or in addition, the database system 300 can determine the security of the data element 410 based on the metadata of the data element 410.

If the data element 410 is secured, the first replication key 402 of the data element 410 is isolated, at block 506. In one or more embodiments of the present invention, the replication key is isolated by decrypting the data element 410. For example, a computer-executable instruction to SELECT the data element 410 is executed. This exposes the current data values of the secured data element 410 and the existing first replication key 402, which is to be isolated. The isolation includes determining a reference/handle to the first replication key 402. The first replication key 402 is stored in the shared key management system 310.

The method 500 further includes invalidating the first replication key 402, at block 508. The invalidation can include instructing the shared key management system 310 to invalidate the first replication key 402. The first replication key 402 that was stored in the shared key management system 310 is invalidated, which makes all copies of the data element 410 in the remote copies, such as at the sites B, C, and D, to be rendered un-decryptable, and in turn unreadable/inaccessible. This is because, the same first replication key 402 that was stored in the shared key management system 310 was used by all the sites A, B, C, and D, in the database system 300 to decrypt the values of the secured data element 410. Accordingly, by invalidating the first replication key 402, all the replicas of the data element 410 in the remote sites are rendered inaccessible.

Further, the method 500 includes determining whether the change instruction 210 is an instruction to update the values stored in the data element 410 to an updated value, such as an UPDATE instruction, or an instruction to delete the data element 410, such as a DELETE instruction, at block 510. If the instruction 210 is to delete the data element 410, the data element 410 is deleted from the first data storage device 102, at block 512. For example, a row can be deleted from table 202.

Alternatively, if the instruction is to update the values stored in the data element 410, a second replication key 404 is generated for the data element 410, at block 514. The second replication key 404 is generated using the shared key management system 310. The second replication key 404 is used to encrypt the updated values from the instruction 210 for the data element 410, at block 516. In one or more embodiments of the present invention, the updated values in the change-table 220 are encrypted.

Further, the second replication key 404 is stored in the shared key management system 310 in association with the data element 410, at block 518. This can include storing a handle/reference of the second replication key 404 at the first data storage device 102. For example, the handle can be stored as part of the metadata of the data element 410. Alternatively, or in addition, the second replication key 404 is stored in the data element 410 itself. In one or more examples, the handle to the second replication key 404 is encrypted prior to storing. Further, the secured updated value from the change-table 220 is stored in the data element 410 in the target table 204, at block 520.

In the case where the data element 410 is not secured, the database system 300 can proceed as in the typical case without having to handle the replication key. For example, in the case of a delete instruction, the data element 410 is deleted from the first data storage device 102, at blocks 522 and 512. In the case of an update instruction, the data element 410 is updated with the new values provided in the instruction 210, at blocks 522 and 520. These delete and update instructions, in the case of non-secured data elements, can be performed using the change replication techniques that are known.

The database system 300 can replicate the modified data element from the first data storage device 102 to the other storage devices at other sites as it typically does to maintain distributed replicas of the data. Such replication can be asynchronous.

Figure 6:
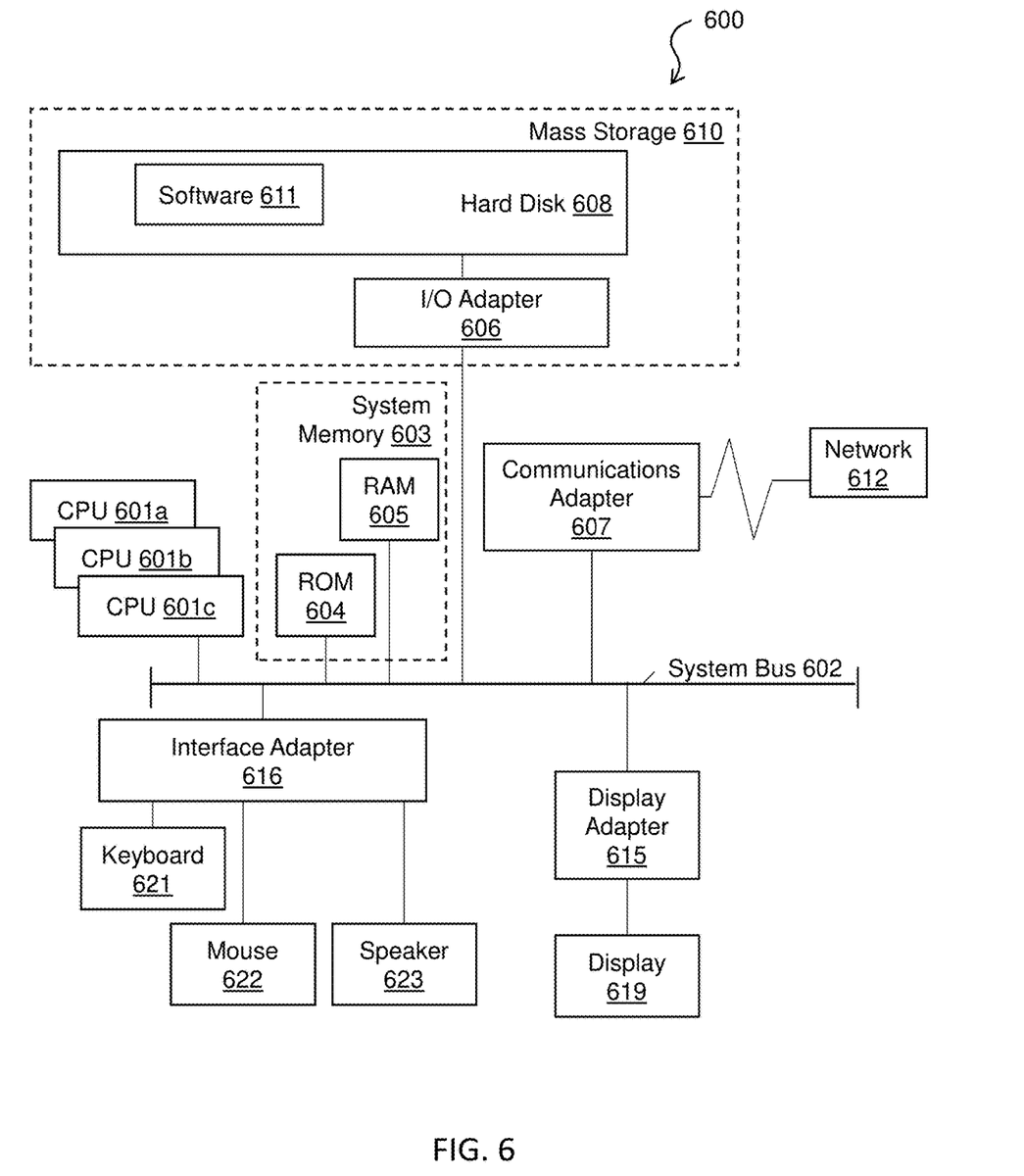
FIG. 6 is a schematic diagram of an illustrative computing device configured to implement one or more example embodiments of the invention.

Turning now to FIG. 6, a computer system 600 is generally shown in accordance with an embodiment. The computer system 600 is part of the database system 100 and the database system 300 and facilitates executing methods described herein. The computer system 600 is responsible for handling/providing the various functionalities of the database system 100 or the database system 300. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to system memory 603 and various other components. The system memory 603 can include a read-only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read-only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described hereinbelow with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics-intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external web server or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
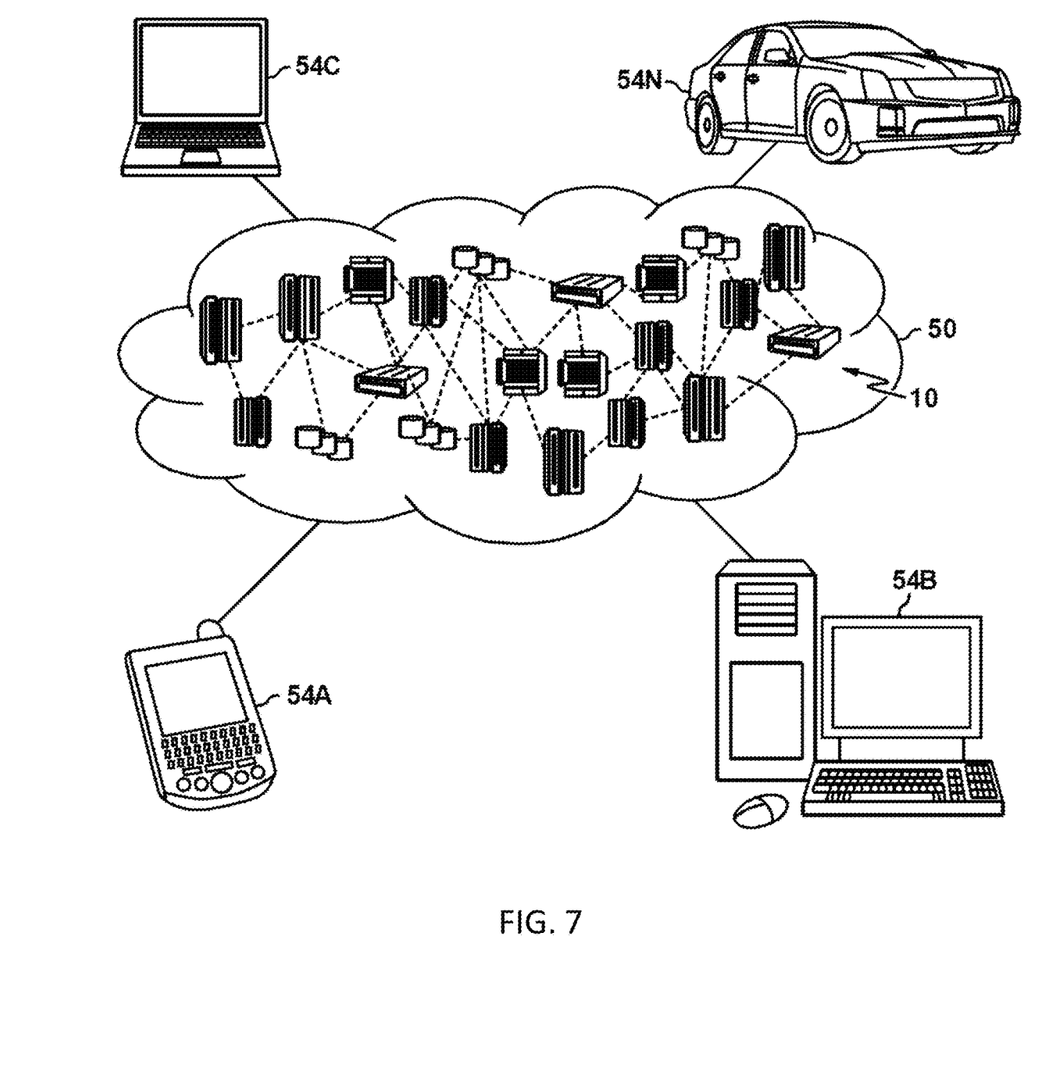
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
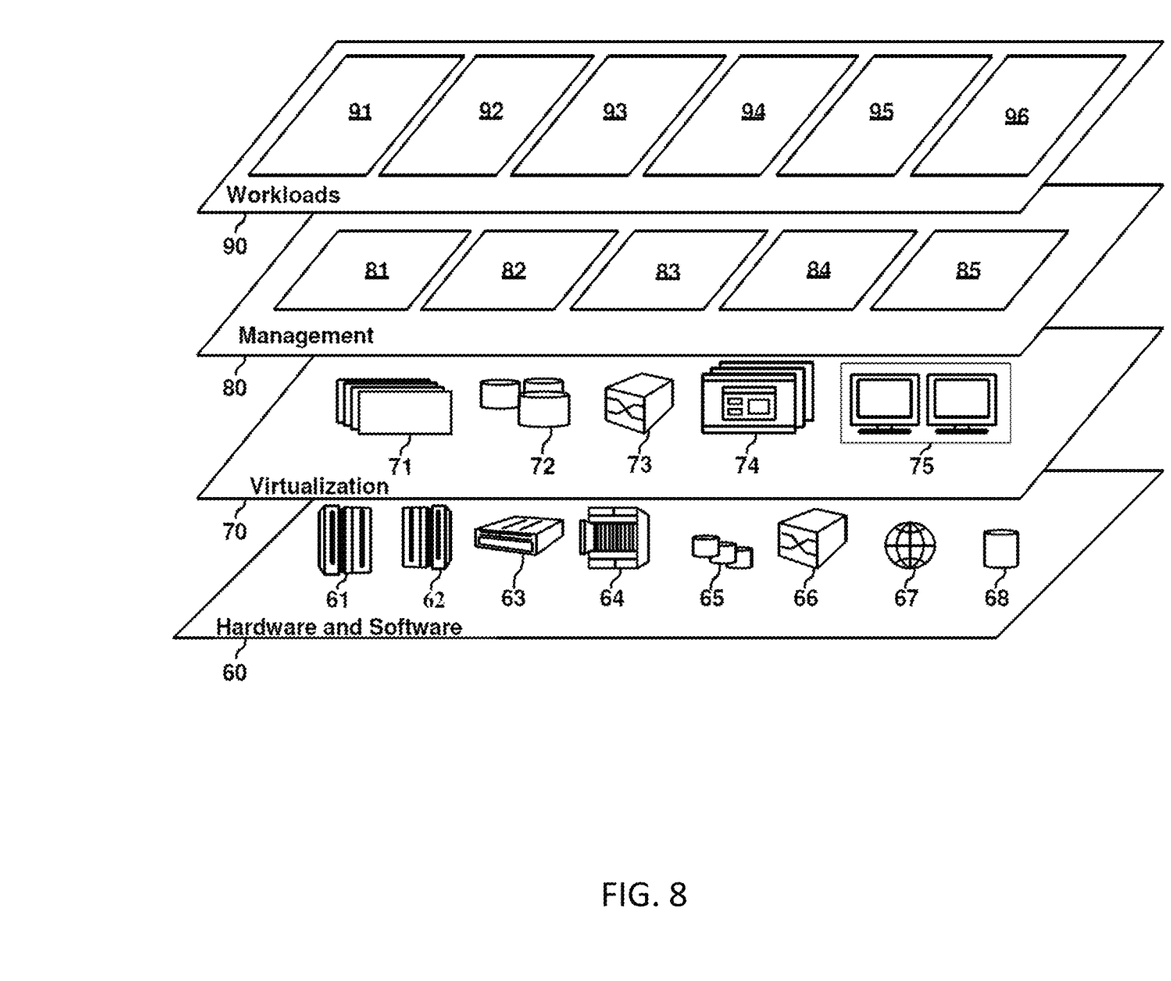
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data replication 96.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or another device to cause a series of operational steps to be performed on the computer, other programmable apparatus or another device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for replicating data changes through distributed invalidation, the method comprising:
   receiving, by a first server of a distributed database system, an instruction to update a data element in a table to an updated content, the distributed database system comprising the first server and a second server, a first copy of the table is stored on the first server, and a second copy of the table is stored on the second server; and
   performing, in response to the receiving:
      determining that the data element is secured by a replication key that is stored on a shared key management system that is accessible by the first server and by the second server, wherein the replication key is specific to the data element from the table and is shared across the first server and the second server, the data element representing a record in the table;
      invalidating the replication key on the shared key management system, which makes the data element in the second copy of the table inaccessible; and
      modifying the first copy of the table on the first server according to the instruction that is received, the modifying comprising:
         generating a new replication key specific to the data element being changed;
         updating the first copy of the table on the first server by replacing content of the data element with the updated content after encryption using the new replication key; and
         updating the shared key management system to store the new replication key specific to the data element of the table.

2. The method of claim 1, wherein the data element is a row in the table.

3. The method of claim 1, wherein the data element is a data field in the table.

4. The method of claim 1, wherein the replication key associated with the data element is a first replication key, and the method further comprises:
   generating a second replication key for the data element;
   securing the updated content with the second replication key; and
   storing a reference to the second replication key in association with the data element.

5. The method of claim 1, wherein a handle to the replication key that is associated with the data element is stored in metadata associated with the data element.

6. The method of claim 1, wherein a handle to the replication key that is associated with the data element is stored in the data element.

7. A distributed database system comprising:
   a plurality of computer servers that store replicas of data, the plurality of computer servers comprising at least a first server and a second server;
   a memory device; and
   one or more processors coupled with the memory device and the plurality of computer servers, the one or more processors configured to perform a method for replicating data changes through distributed invalidation in response to receiving an instruction to change a data element in a table, a first copy of the table is stored on the first server and a second copy of the table is stored on the second server, and wherein the method comprises:

determining that the data element is secured by a replication key that is stored on a shared key management system that is accessible by the first server and by the second server, wherein the replication key is specific to the data element from the table and is shared across the first server and the second server, the data element representing a record in the table;

invalidating the replication key on the shared key management system, which makes the data element in the second copy of the table inaccessible; and     modifying the first copy of the table on the first server according to the instruction that is received, the modifying comprising:

generating a new replication key specific to the data element being changed;

updating the first copy of the table on the first server by replacing content of the data element with the updated content after encryption using the new replication key; and         updating the shared key management system to store the new replication key specific to the data element of the table.

8. The system of claim 7, wherein the data element is a row in the table.

9. The system of claim 7, wherein the data element is a data field in the table.

10. The system of claim 7, wherein the replication key associated with the data element is a first replication key, and the method further comprises:

generating a second replication key for the data element;

securing the updated content with the second replication key; and     storing a reference to the second replication key in association with the data element.

11. The system of claim 7, wherein a handle to the replication key that is associated with the data element is stored in metadata associated with the data element.

12. The system of claim 7, wherein a handle to the replication key that is associated with the data element is stored in the data element.

13. A computer program product comprising a storage medium readable by one or more processing circuits, the storage medium storing instructions executable by the one or more processing circuits to cause a method for replicating data changes through distributed invalidation to be performed, the method comprises:

receiving an instruction to change a data element in a table, a first copy of the table is stored on a first server and a second copy of the table is stored on a second server, wherein the first server and the second server are part of a distributed database system, and in response:

determining that the data element is secured by a replication key that is stored on a shared key management system that is accessible by the first server and by the second server, wherein the replication key is specific to the data element from the table and is shared across the first server and the second server, the data element representing a record in the table;

invalidating the replication key on the shared key management system, which makes the data element in the second copy of the table inaccessible; and         modifying the first copy of the table on the first server according to the instruction that is received, the modifying comprising:

generating a new replication key specific to the data element being changed;

updating the first copy of the table on the first server by replacing content of the data element with the updated content after encryption using the new replication key; and             updating the shared key management system to store the new replication key specific to the data element of the table.

14. The computer program product of claim 13, wherein the replication key associated with the data element is a first replication key, and the method further comprises:

generating a second replication key for the data element;

securing the updated content with the second replication key; and     storing a reference to the second replication key in association with the data element.

15. The computer program product of claim 13, wherein the data element is a row in the table.

16. The computer program product of claim 13, wherein the data element is a data field in the table.

\* \* \* \* \*